United States Patent [19]

Friedle et al.

[11] Patent Number: 4,880,403

[45] Date of Patent: Nov. 14, 1989

[54] ANTI-SIPHON FUEL VALVE ASSEMBLY FOR MARINE INSTALLATIONS

[75] Inventors: Dennis J. Friedle, Lake Villa; Richard P. Kolb, Prairie View; Kenneth M. McLeod, Lake Villa, all of Ill.

[73] Assignee: Outboard Marine Corporation, Waukegan, Ill.

[21] Appl. No.: 108,396

[22] Filed: Sep. 29, 1987

[51] Int. Cl.[4] ........................ B63H 21/26; B60R 25/04

[52] U.S. Cl. ................................ 440/88; 123/198 DB

[58] Field of Search ..................... 123/198 DB, 198 B; 251/129.2; 440/88

[56] References Cited

U.S. PATENT DOCUMENTS

| | | | |
|---|---|---|---|
| 2,406,246 | 8/1946 | Ogden | 251/129.2 |
| 3,173,646 | 3/1965 | Wilcox | 251/129.2 |
| 3,780,980 | 12/1973 | Kallel | 251/129.2 |
| 3,907,060 | 9/1975 | Burton et al. | 123/198 DB |
| 4,043,211 | 8/1977 | Romanenko et al. | 251/129.2 |
| 4,449,945 | 5/1984 | Ferguson | 440/88 |
| 4,721,078 | 1/1988 | Watanabe et al. | 123/198 DB |

*Primary Examiner*—Joseph F. Peters, Jr.
*Assistant Examiner*—Edwin L. Swinehart
*Attorney, Agent, or Firm*—Michael, Best & Friedrich

[57] ABSTRACT

A marine installation comprising a propulsion unit adapted to be mounted on a boat for pivotal movement relative thereto about a generally vertical steering axis, the propulsion unit including a rotatably mounted propeller, an engine drivingly connected to the propeller, a fuel supply valve adapted to communicate between a fuel reservoir and the engine and actuatable between a first state and a second state for respectively permitting and preventing fuel flow from the fuel reservoir, a control switch operably connected to the engine and actuatable between a first state and a second state for respectively permitting and preventing engine operation, and a mechanism responsive to the state of both the fuel supply valve and the control switch for maintaining the fuel supply valve and the control switch in the same state.

21 Claims, 3 Drawing Sheets

Fig. 14
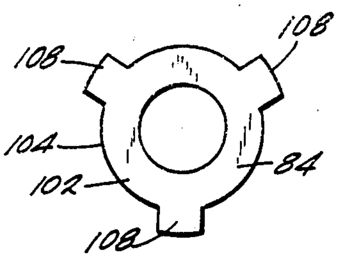
Fig. 15
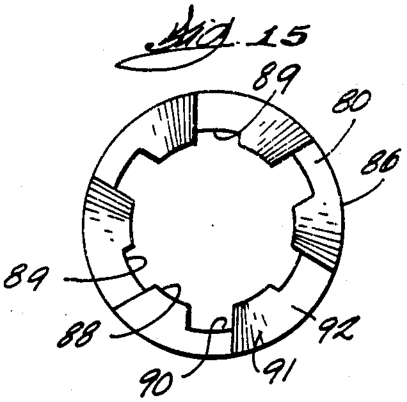
Fig. 16
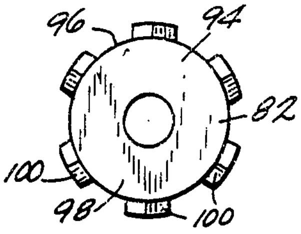
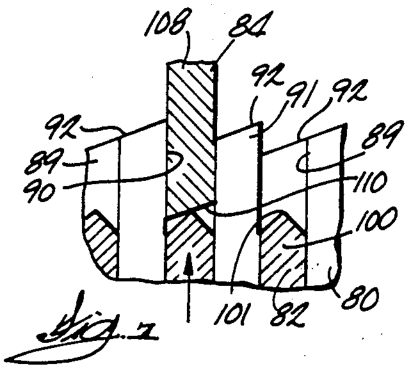
Fig. 7
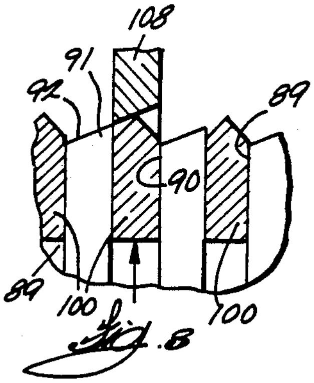
Fig. 8
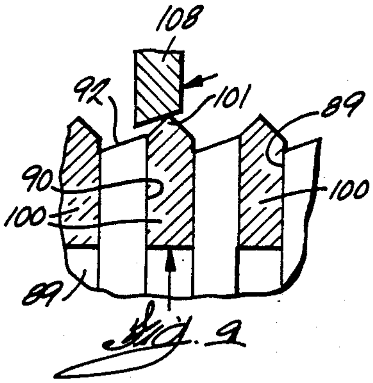
Fig. 9
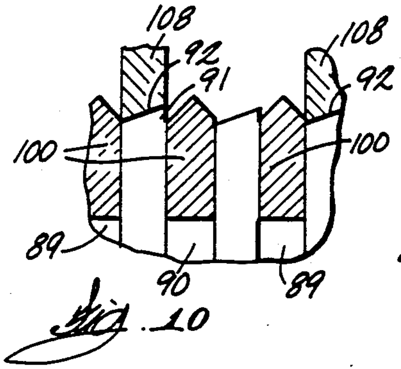
Fig. 10
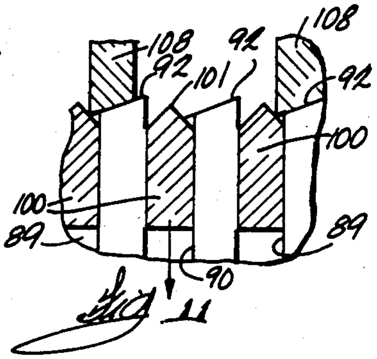
Fig. 11
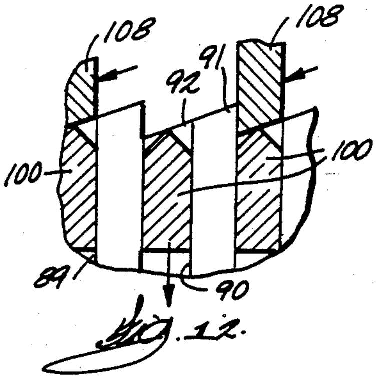
Fig. 12
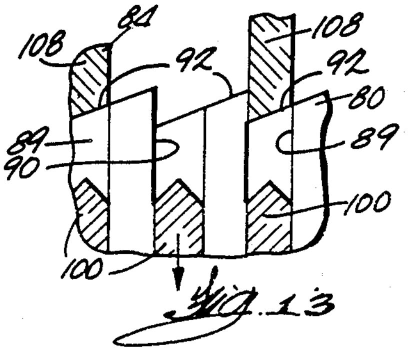
Fig. 13

ANTI-SIPHON FUEL VALVE ASSEMBLY FOR MARINE INSTALLATIONS

BACKGROUND OF THE INVENTION

The invention relates to fuel supply valves for controlling fuel flow between a fuel reservoir and an engine. More particularly, the invention relates to such fuel supply valves used in connection with marine installations.

A typical marine installation includes an outboard motor mounted on the transom of a boat, a remotely located fuel tank, and a fuel supply valve communicating between the fuel tank and the engine of the outboard motor. The fuel supply valve prevents fuel from flowing out of the fuel tank when the engine is not running or when the fuel line is disconnected from the engine.

A known fuel supply valve apparatus includes a solenoid which opens and closes the valve and which is connected to the engine ignition system so that the solenoid is energized to open the valve when the ignition system is on. A disadvantage of this arrangement is that the solenoid is constantly energized when the engine is operating. As a result, the solenoid can become undesirably heated, and the solenoid causes a steady draw on the battery.

Attention is directed to the following U.S. Pat. Nos.:

| | | |
|---|---|---|
| Ogden | 2,406,246 | Aug. 20, 1946 |
| Wilcox | 3,173,646 | Mar. 16, 1965 |
| Kallel | 3,780,980 | Dec. 25, 1973 |
| Romanenko, et al. | 4,043,211 | Aug. 23, 1977 |

SUMMARY OF THE INVENTION

The invention provides a marine installation comprising a propulsion unit adapted to be mounted on a boat for pivotal movement relative thereto about a generally vertical steering axis, the propulsion unit including a rotatably mounted propeller, an engine drivingly connected to the propeller, a fuel supply valve adapted to communicate between a fuel reservoir and the engine and actuatable between a first state and a second state for respectively permitting and preventing fuel flow from the fuel reservoir, a control switch operably connected to the engine and actuatable between a first state and a second state for respectively permitting and preventing engine operation, and means responsive to the state of both the fuel supply valve and the control switch for maintaining the fuel supply valve and the control switch in the same state.

In one embodiment, the maintaining means includes a solenoid actuatable between an energized condition and a deenergized condition, means for changing the state of one of the fuel supply valve and the control switch in response to momentary energization of the solenoid, and means for momentarily energizing the solenoid when the fuel supply valve and the control switch are in different states.

In one embodiment, the energizing means includes means responsive to input from both the fuel supply valve and the control switch for producing an output when the fuel supply valve and the control switch are in different states, and means for momentarily energizing the solenoid in response to the output.

In one embodiment, the means for momentarily energizing the solenoid includes a valve switch actuatable between a first state and a second state, means for maintaining the valve switch in the same state as the fuel supply valve, and means for momentarily energizing the solenoid when the valve switch and the control switch are in different states.

In one embodiment, the engine includes an ignition system, and the control switch is operably connected to the ignition system, is closed in the first state, and is open in the second state.

In one embodiment, the fuel supply valve is open in the first state and is closed in the second state.

In one embodiment, the maintaining means includes a solenoid actuatable between an energized condition and a deenergized condition, means for changing the state of one of said fuel supply valve and said control switch in response to energization and deenergization of the solenoid, and means for energizing and deenergizing the solenoid when the fuel supply valve and the control switch are in different states.

The invention also provides a marine installation comprising a propulsion unit adapted to be mounted on a boat for pivotal movement relative thereto about a generally vertical steering axis, the propulsion unit including a rotatably mounted propeller, an engine drivingly connected to the propeller, a fuel supply valve adapted to communicate between a fuel reservoir and the engine and actuatable between an first state and a second state for respectively permitting and preventing fuel flow from the fuel reservoir, a solenoid actuatable between an energized condition and a deenergized condition, means for momentarily energizing the solenoid, and means for changing the state of the fuel supply valve when the solenoid is momentarily energized.

The invention also provides a valve apparatus for use with a marine installation including a propulsion unit adapted to be mounted on a boat for pivotal movement relative thereto about a generally vertical steering axis, the propulsion unit including a rotatably mounted propeller, an engine drivingly connected to the propeller, a fuel reservoir, and a control switch operably connected to the engine and actuatable between a first state and a second state for respectively permitting and preventing engine operation, the apparatus comprising a fuel supply valve adapted to communicate between the fuel reservoir and the engine and actuatable between a first state and a second state for respectively permitting and preventing fuel flow from the fuel reservoir, and means responsive to the state of both the fuel supply valve and the control switch for maintaining the fuel supply valve and the control switch in the same state.

The invention also provides a valve apparatus comprising a valve including an inlet and an outlet, the valve being actuatable between a first state and a second state for respectively permitting and preventing fluid flow from the inlet to the outlet, solenoid means for changing the state of the valve, a valve switch actuatable between an open state and a closed state, and means for opening the valve switch when the valve is in one of the first and second states and for closing the valve switch when the valve is in the other of the first and second states.

A principal feature of the invention is the provision of a marine installation comprising a fuel supply valve, an ignition switch, and means responsive to the state of both the fuel supply valve and the ignition switch for maintaining the fuel supply valve and the ignition switch in the same state, i.e., for insuring that either the fuel supply valve is closed and the ignition switch is off or the fuel supply valve is open and the ignition switch is on. Known systems are only responsive to the state of the ignition switch.

Another principal feature of the invention is the provision of such maintaining means including a solenoid and means for changing the state of the fuel supply valve in response to momentary energization of the solenoid. With this arrangement, it is not necessary to have the solenoid constantly energized in order to keep the fuel supply valve open. When the fuel supply valve is closed, it is only necessary to momentarily energize the solenoid in order to open the fuel supply valve and keep the fuel supply valve open. In order to close the fuel supply valve, the solenoid is again momentarily energized.

Other principal features of the invention will become apparent to those skilled in the art upon review of the following detailed description, claims, and drawings.

DESCRIPTION OF THE DRAWINGS

FIG. 7 is a sectional view taken along arc 7—7 in FIG. 6.

FIGS. 8 through 13 are views similar to FIG. 7 and showing the interaction between the cog, pawl and plunger.

FIG. 14 is a top view of the cog.

FIG. 15 is a top view of the pawl member.

FIG. 16 is top view of the plunger.

Figure 1:
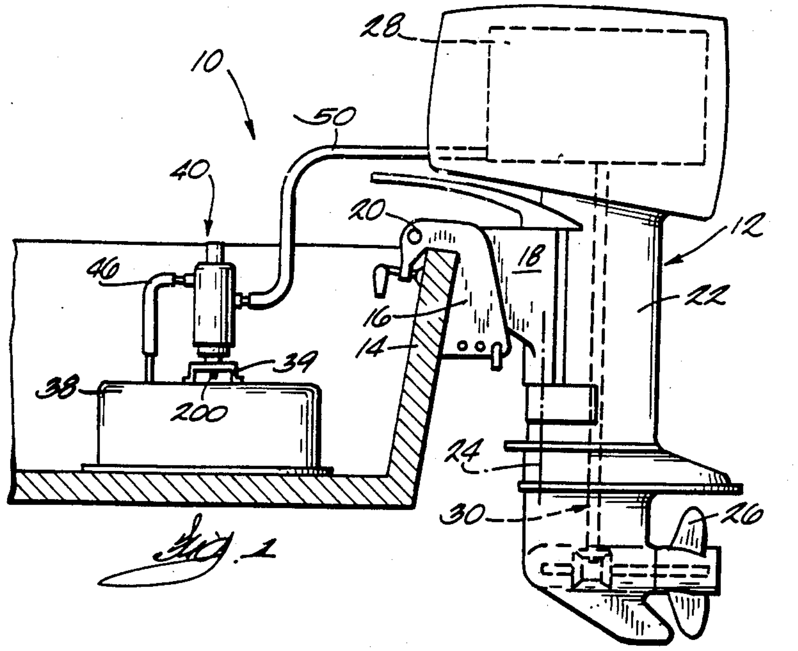
FIG. 1 is a side elevational view, partially in section, of a marine installation embodying the invention.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

A marine installation 10 embodying the invention is illustrated in the drawings. As shown in FIG. 1, the marine installation 10 comprises a marine propulsion device 12 mounted on the transom 14 of a boat. While the illustrated marine propulsion device 12 is an outboard motor, it should be understood that in alternative embodiments the marine propulsion device 12 can be a stern drive unit.

The marine propulsion device 12 includes a transom bracket 16 fixedly mounted on the transom 14, and a swivel bracket 18 mounted on the transom bracket 16 for pivotal movement relative thereto about a generally horizontal tilt axis 20. The marine propulsion device 12 also includes a propulsion unit 22 mounted on the swivel bracket 18 for pivotal movement relative thereto about a generally vertical steering axis 24. The propulsion unit 22 includes a rotably mounted propeller 26, and an engine 28 drivingly connected to the propeller 26 by a conventional drive train 30.

Figure 4:
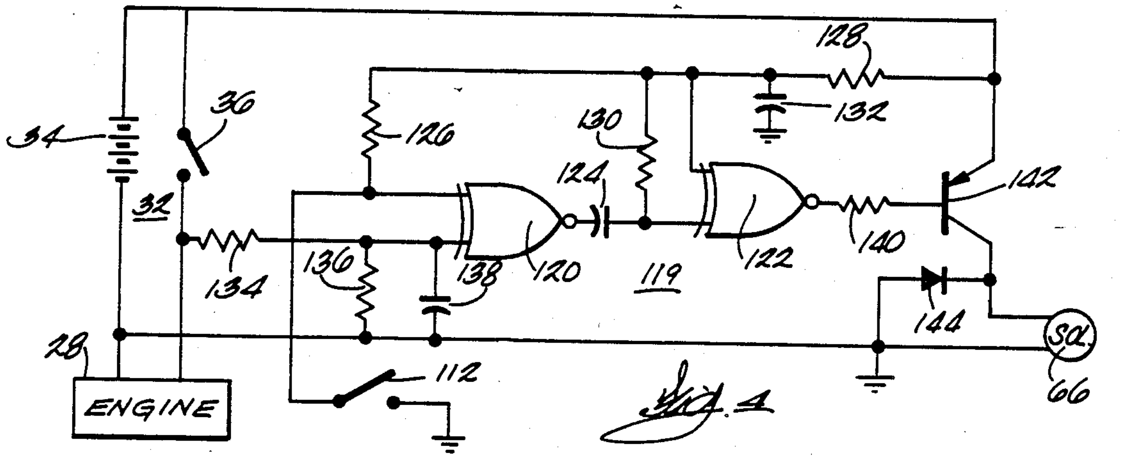
FIG. 4 is a schematic view of the electrical circuit of the valve assembly.
Figure 5:
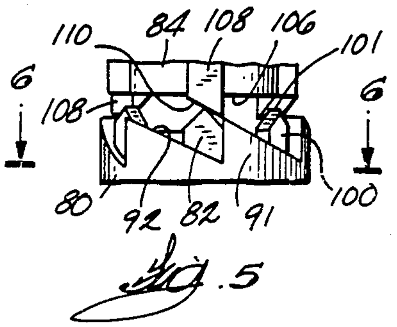
FIG. 5 is a partial side elevational view of the cog, pawl and plunger of the valve assembly.

The marine propulsion device 12 further comprises an ignition system 32 which is shown schematically in FIG. 4. The ignition system 32 includes a battery 34, an ignition switch 36 connected between the battery 34 and the engine 28, and other suitable components not a part of the invention. The ignition switch 36 constitutes a control switch operably connected to the engine 28 and actuatable between a first or closed state and a second or open state for respectively permitting and preventing engine operation.

The marine installation 10 also comprises (see FIG. 1) a conventional fuel reservoir or fuel tank 38 located remotely from the marine propulsion device 12 and inside the boat.

Figure 2:
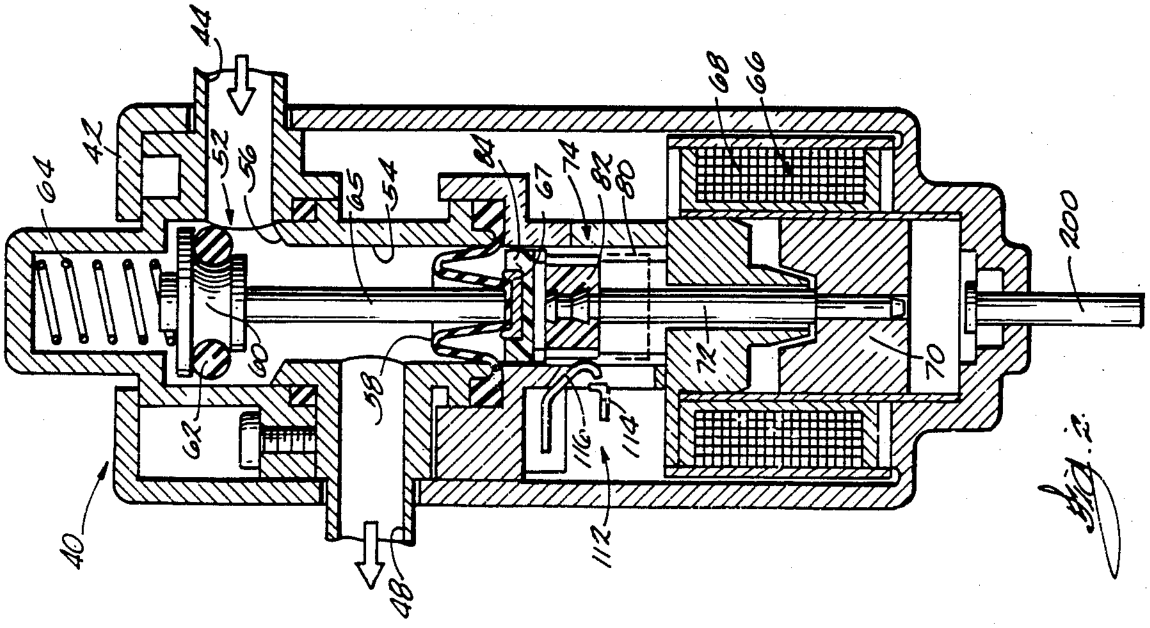
FIG. 2 is a sectional view of the valve assembly with the solenoid energized.

The marine installation 10 further comprises (see FIGS. 1–3) a fuel supply valve apparatus 40 communicating between the fuel tank 38 and the engine 28. In the illustrated construction, the valve apparatus 40 is mounted on top of the fuel tank 38 via a bracket 39 and includes a housing 42 having an inlet 44 communicating with the fuel tank 38 via a conduit 46, and an outlet 48 communicating with the engine 28 via a conduit 50. The valve apparatus 40 also includes (see FIGS. 2 and 3) a fuel supply valve 52 communicating between the inlet 44 and the outlet 48 and therefore between the fuel tank 38 and the engine 28. The fuel supply valve 52 is actuatable between a first or open state (shown in FIG. 2) and a second or closed state (shown in Fig. 3) for respectively permitting and preventing fuel flow from the fuel tank 38. The fuel supply valve 52 includes a passage 54 communicating between the inlet 44 and the outlet 48 and having therein a valve seat 56. The lower end of the passage 54 is closed by a flexible diaphragm 58. The valve 52 also includes a valve member 60 movable between a closed position (FIG. 3) and an open position (FIG. 2). The valve member 60 has thereon a sealing ring 62 which engages the valve seat 56 (see FIG. 3) when the valve member 60 is in the closed position. The valve member 60 is biased toward the closed position by a spring 64 extending between the housing 42 and the valve member 60. A rod 65 extends downwardly from the valve member 60 and through the passage 54. The lower end of the rod 65 engages the upper side of the diaphragm 58 and is secured to the diaphragm 58 by a cap 67.

Figure 3:
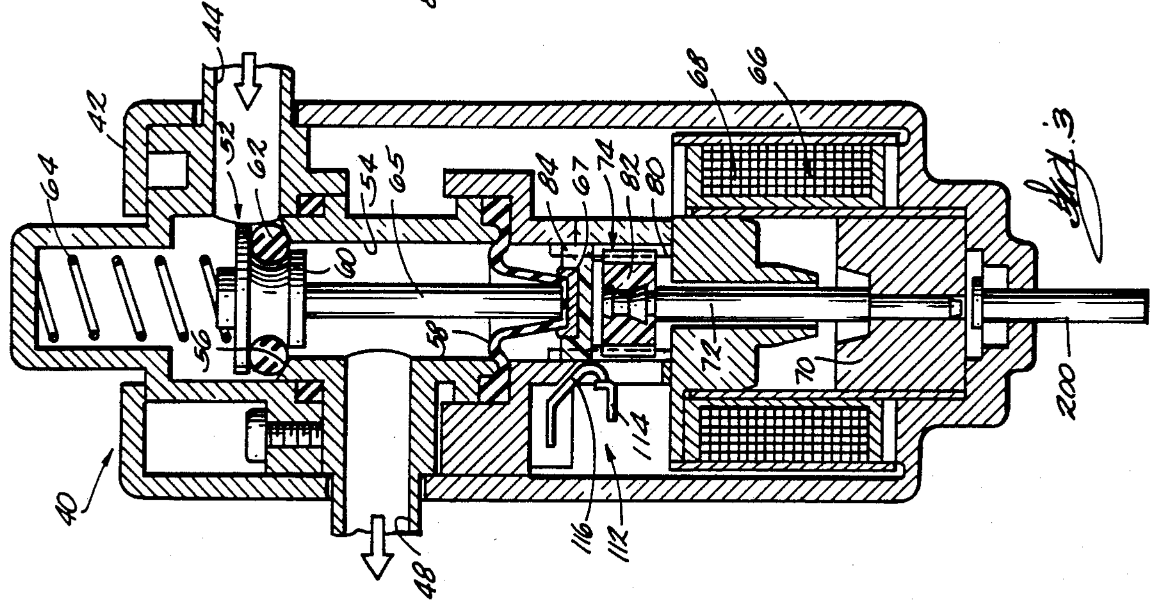
FIG. 3 is view similar to FIG. 2 with the solenoid deenergized.

The valve apparatus 40 also includes means responsive to the state of both the fuel supply valve 52 and the ignition switch 36 for maintaining the fuel supply valve 52 and the ignition switch 36 in the same state, i.e., for insuring that fuel supply valve 52 and the ignition switch 36 are either both in the first state (so that the fuel supply valve 52 is open and the ignition switch 36 is closed) or both in the second state (so that the fuel supply valve 52 is closed and the ignition switch 36 is open). While various suitable means can be employed, in the preferred embodiment, such means includes a solenoid 66 actuatable between an energized condition (FIG. 2) and a deenergized condition (FIG. 3). The solenoid 66 includes a coil 68, and a plunger 70 movable upwardly in response to energization of the coil 68. A rod 72 extends upwardly from and moves with the plunger 70.

The means for maintaining the fuel supply valve 52 and ignition switch 36 in the same state also includes means for changing the state of one of the fuel supply valve 52 and the ignition switch 36 in response to momentary energization of the solenoid 66, or means for changing the state of one of the fuel supply valve 52 and the ignition switch 36 in response to energization and deenergization of the solenoid 66. While various suitable changing means can be used, in the illustrated construction, the changing means changes the state of the fuel supply valve 52 and includes an assembly 74 extending between the solenoid rod 72 and the cap 67. The assembly 74 is substantially identical to the mechanism found in a push button ball point pen. A similar arrangement, which could be used in place of the assembly 74, is disclosed in Wilcox, U.S. Pat. No. 3,173,646, issued Mar. 16, 1965, which is hereby incorporated by reference.

Figure 6:
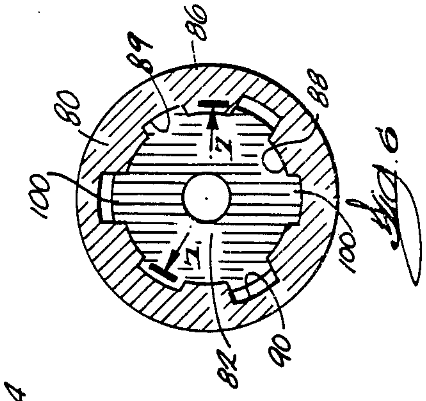
FIG. 6 is a cross-sectional view taken along line 6—6 in FIG. 5.

The assembly 74 includes a pawl member 80 stationarily or fixedly supported in the housing 42 by any suitable means, a plunger 82 fixedly attached to the upper end of the solenoid rod 72 and slidably housed within the pawl member 80, and a cog 84 engaging the underside of the cap 67 and engageable with both the pawl member 80 and the plunger 82. The construction of the pawl member 80, the plunger 82 and the cog 84 is best shown in Figs. 5 through 16. As shown in FIGS. 6 and 15, the pawl member 80 has a generally cylindrical outer surface 86 and has therein a cylindrical bore 88. The inner wall of the bore 88 has therein six longitudinally or vertically extending grooves or recesses which are spaced at 60° intervals and which include three alternately spaced shallow recesses 89 and three alternately spaced deep recesses 90. The upper end of the pawl member 80 includes (see FIGS. 5, 7 and 15) six arcuate, sloped portions 91 each having an angled, upwardly facing surface 92 located above a respective recess 89 or 90.

The plunger 82 includes (see FIGS. 5–7 and 16) a cylindrical body portion 94 having an outer surface 96 and an upper end 98, and six projections 100 extending radially outwardly from the outer surface 96 and upwardly from the upper end 98 of the body portion 94. The projections 100 are spaced at 60° intervals and each has (see FIGS. 5 and 7) an upper end 101 with the shape of an inverted V. The body portion 94 of the plunger 82 is slidably housed within the cylindrical bore 88 of the pawl member 80, and each projection 100 of the plunger 82 is slidably housed in a respective recess 89 or 90 of the pawl member 80. As shown in FIG. 6, the plunger projections 100 have substantially equal radial lengths which are substantially equal to the radial lengths of the shallow recesses 89.

The cog 84 includes (see FIGS. 5 and 14) a body portion 102 having a cylindrical outer surface 104 and a lower end 106 (FIG. 5), and three projections 108 which extend radially outwardly from the outer surface 104 of the body portion 102 and downwardly from the lower end 106 of the body portion 102. The projections 108 are spaced at 120° intervals and each has a generally planar lower surface 110 (FIGS. 5 and 7) that is sloped at an angle substantially equal to the angle of the upper surfaces 92 of the pawl member 80. The body portion 102 of the cog 84 is adapted to be slidably housed in the cylindrical bore 88 of the pawl member 80, and the projections 108 of the cog 84 are adapted to be slidably housed in the deep recesses 90 of the pawl member 80. As shown in FIGS. 14 and 15, the projections 108 of the cog 84 have radial lengths substantially equal to the radial lengths of the deep recesses 90 of the pawl member 80, so that the cog 84 can slide into the pawl member 80 when the cog projections 108 are aligned with the deep recesses 90 of the pawl member 80, but cannot slide into the pawl member 80 when the cog projections 108 are aligned with the shallow recesses 89 of the pawl member 80. When the cog projections 108 are aligned with the shallow recesses 89 of the pawl member 80, the lower surface 110 of each cog projection 108 rests on an upper surface 92 of the pawl member 80, and each cog projection 108 engages the end of an adjacent sloping portion 91 of the pawl member 80.

Thus, the cog 84 is rotatable relative to the pawl member 80 between alternate positions wherein the cog 84 is slidably housed within the pawl member 80, and alternate positions wherein the cog 84 rests on top of the pawl member 80.

The cog 84 is rotated by upward and downward movement of the plunger 82 in response to energization and deenergization of the solenoid 66. The interaction between the pawl member 80, the plunger 82 and the cog 84 is shown in FIGS. 7 through 13.

In FIG. 7, the cog 84 is shown with the cog projections 108 aligned with the deep recesses 90 of the pawl member 80 and with the cog 84 down inside the pawl member 80 (so that the valve 52 is closed), and the plunger 82 is shown moving upwardly in response to energization of the solenoid 66. As the plunger 82 moves upwardly, the upper ends 101 of alternate plunger projections 100 engage the lower surfaces 110 of respective cog projections 108 to move the cog 84 upwardly.

As the cog 84 moves upwardly, each cog projection 108 becomes aligned with the upper surface 92 of the adjacent sloping portion 91 of the pawl member 80. This is shown in FIG. 8. Further upward movement of the cog 84 causes each cog projection 108 to clear the upper surface 92 of the adjacent sloping portion 91 of the pawl member 80. At this point, the force exerted by the spring 64 causes the cog projections 108 to slide off the upper ends 101 of the associated plunger projections 100 (see FIG. 9) and thereby causes the cog 84 to rotate relative to the pawl member 80 and to the plunger 82. Eventually, as shown in FIG. 10, the cog projections 108 slide completely off the associated plunger projections 100 and onto the upper surfaces 92 of the adjacent pawl member sloping portions 91. If at this point the solenoid 66 is still energized so that the plunger projections 100 extend above the upper surfaces 92 of the pawl member sloping portions 91, the plunger projections 100 will prevent further movement of the cog projections 108. This is also shown in FIG. 10.

When the solenoid 66 is deenergized, the plunger projections 100 move downwardly, as shown in FIG. 11, and permit the cog projections 108 to slide farther downwardly on their respective sloping portions 91. Eventually, as shown in FIG. 12, the cog projections 108 slide to the lower ends of the associated sloping portions 91 and engage the adjacent sloping portions 91. At this point, the cog projections 108 are aligned with the shallow recesses 89 of the pawl member 80, and the cog 84 cannot slide down into the pawl member 80 because the cog projections 108 have greater radial lengths than the shallow recesses 89 of the pawl member 80. Therefore, the cog 84 remains on top of the pawl member 80 even after the upper ends 101 of the plunger projections 100 move downwardly out of engagement with the cog projections 108. This is shown in FIG. 13.

Subsequent energization and deenergization of the solenoid 66 causes the plunger 82 to rotate the cog 84 again until the cog projections 108 are aligned with the deep recesses 90 of the pawl member 80 and the cog 84 slides down into the pawl member 80.

Thus, when the cog 84 is sitting on top of the pawl member 80 (as shown in FIG. 13), so that the valve 52 is held in the open position, energization and deenergization of the solenoid 66 causes the cog 84 to slide down into the pawl member 80 and thereby close the valve 52. When the cog 84 is housed within the pawl member 80, so that the valve 52 is closed, subsequent energization and deenergization of the solenoid 66 causes the cog 84 to sit on top of the pawl member 80, thereby opening the valve 52. Thus, momentary energization of the solenoid 66 changes the state of the fuel supply valve 52.

The means for maintaining the fuel supply valve 52 and the ignition switch 36 in the same state also includes means for momentarily energizing the solenoid 66 when the fuel supply valve 52 and the ignition switch 36 are in different states, or for energizing and deenergizing the solenoid 66 when the fuel supply valve 52 and the ignition switch 36 are in different states. While various suitable energizing means can be employed, in the preferred embodiment, the energizing means includes (see FIGS. 2–4) a valve switch 112 actuatable between a first or open state and a second or closed state. The valve switch 112 includes (see FIGS. 2 and 3) a stationary contact 114, and a movable contact 116 which is normally spaced from the stationary contact 114 (see FIG. 2). The movable contact 116 extends into a deep recess 90 of the pawl member 80 so that it is engaged by the cog 84 and moved into contact with the stationary contact 114 (see FIG. 3) when the cog 84 slides down into the pawl member 80. As shown schematically in FIG. 4, one contact of the valve switch 112 is connected to circuit ground.

The energizing means also includes means for maintaining the valve switch 112 in the same state as the fuel supply valve 52, i.e., for maintaining the valve switch 112 open when the fuel supply valve 52 is open and maintaining the valve switch 112 closed when the fuel supply 52 valve is closed. While various suitable means can be used, in the illustrated construction, the means for maintaining the valve switch 112 in the same state as the fuel supply valve 52 includes the cog 84. As explained previously, the cog 84 sits on top of the pawl member 80 when the fuel supply valve 52 is open and slides down inside the pawl member 80 when the fuel supply valve 52 is closed. When the cog 84 slides down inside the pawl member 80, it deflects the movable contact 116 and closes the valve switch 112. Therefore, when the fuel supply valve 52 is closed, the valve switch 112 is closed, and when the fuel supply valve 52 is open, the valve switch 112 is open.

The means for momentarily energizing the solenoid 66 also includes means for momentarily energizing the solenoid 66 when the valve switch 112 and the ignition switch 36 are in different states. While various suitable means can be employed, in the preferred embodiment, such means includes means responsive to input from both the fuel supply valve 52 and the ignition switch 36 for producing an output when the fuel supply valve 52 and the ignition switch 36 are in different states, i.e., when both are open or both are closed, and means for momentarily energizing the solenoid 66 in response to the output. In the preferred embodiment, the means responsive to input from the fuel supply valve 52 and the ignition switch 36 receives input from the valve switch 112 (which is always in the same state as the fuel supply valve 52) and from the ignition switch 36.

The means for momentarily energizing the solenoid 66 when the valve switch 112 and the ignition switch 36 are in different states includes an electrical system 119 which is shown in FIG. 4. As illustrated, the electrical system 119 includes first and second exclusive OR-gates 120 and 122, respectively, and a capacitor 124 coupling the output of the first exclusive OR-gate 120 to one input of the second exclusive OR-gate 122. One input of the first exclusive OR-gate 120 is connected to the other contact of the valve switch 112 (the contact not connected to circuit ground) and is coupled through resistors 126 and 128 to the positive polarity terminal of the battery 34. An additional resistor 130 is connected between the one input of the second exclusive OR-gate 122 and the juncture of the resistors 126 and 128. The other input of the second exclusive OR-gate 122 is directly connected to the juncture of the resistors 126 and 128, and a bypass capacitor 132 is connected between circuit ground and the juncture of the resistors 126 and 128.

The other input of the first exclusive OR-gate 120 is coupled through a resistor 134 to the engine side of the ignition switch 36 and is also coupled through a parallel-connected resistor 136 and capacitor 138 to circuit ground.

The output of the second exclusive OR-gate 122 is coupled through a resistor 140 to the base of a PNP transistor 142 having its emitter connected to the positive polarity terminal of the battery 34 and its collector connected to one terminal of the solenoid 66. The remaining terminal of the solenoid 66 is connected to circuit ground as is the negative polarity terminal of the battery 34. A normally reverse-biased diode 144 is connected across the terminals of the solenoid 66.

During circuit operation, each of the first and second exclusive OR-gates 120 and 122 functions to provide a logic high output when the two gate inputs are the same (i.e. both logic high or both logic low) and to produce a logic low output when the two gate inputs are dissimilar (i.e. one input high and the other low). Accordingly, when the ignition switch 36 is closed and the valve switch 112 is open, both inputs of the first exclusive OR-gate 120 are logic high, and the output of the first exclusive OR-gate 120 is also logic high. As long as the output of the first exclusive OR-gate 120 remains logic high, no voltage appears across the capacitor 124 and the capacitor 124 remains essentially fully discharged. At the same time, the input of the second exclusive OR-gate 122, which input is connected to the juncture of the capacitor 124 and the resistor 130, is logic high as is the remaining input of the second exclusive OR-gate 122. At this time the output of the second exclusive OR-gate 122 is logic high causing the PNP transistor 142 to be biased into cutoff, i.e. rendered non-conductive. As long as the PNP transistor 142 remains non-conductive, no current is provided to the solenoid 66.

In the event the ignition switch 36 is now opened, the capacitor 138 discharges through the resistor 136 causing the one input of the first exclusive OR-gate 120 to become logic low. Because the valve switch 112 remains open, the remaining input of the first exclusive OR-gate 120 remains high and, because the inputs to the first exclusive OR-gate 120 are now dissimilar, the output of the first exclusive OR-gate 120 goes low. The low output of the first exclusive OR-gate 120 is coupled through the initially discharged capacitor 124 to one input of the second exclusive OR-gate 122 causing the output of the second exclusive OR-gate 122 to also go low. This has the effect of biasing the PNP transistor 142 into saturation with the further effect that current is provided to the solenoid 66.

Immediately after the output of the first exclusive OR-gate 120 goes low, the initially discharged capacitor 124 begins charging through the resistor 130 at a rate determined by the values of the capacitor 124 and the resistor 130. After a predetermined, substantially constant, time period determined by the values of the capacitor 124 and the resistor 130, the one input of the second exclusive OR-gate 122 will once again become high causing the output of the second exclusive OR-gate 122 to also become high. This has the effect of once again biasing the PNP transistor 142 into cutoff with the further effect that current flow to the solenoid 66 is interrupted. Thus, upon a high to low transition at the output of the first exclusive OR-gate 120, a current pulse, having a duration substantially equal to the predetermined period determined by the values of the capacitor 124 and the resistor 130, is applied to the solenoid 66. This momentary energization of the solenoid 66 results in actuation of the plunger 70 and a cycling of the valve 52 from its present state (open in the embodiment illustrated) to its opposite state (closed in the embodiment illustrated). This has the further effect of causing the initially open valve switch 112 to close.

Upon closure of the valve switch 112, the input of the first exclusive OR-gate 120, connected to the juncture of the valve switch 112 and the resistor 126, is held low. Because both inputs of the first exclusive OR-gate 120 are now low, the output of the first exclusive OR-gate 120 goes high but, because the one input to the second exclusive OR-gate 122 is already high through the earlier charging of the capacitor 124, no effect is noted at the output cf the second exclusive OR-gate 122 at the time the valve switch 112 opens.

Upon subsequent closure of the ignition switch 36, the input of the first exclusive OR-gate 120, coupled to the resistor 134, is driven high and, because the valve switch 112 remains closed at this time, the output of the first exclusive OR-gate 120 is driven low. This has the effect of providing another current pulse of predetermined length to the solenoid 66 in the manner previously described, and, in turn, results in further cycling of the valve 52 causing the now closed valve switch 112 to open. When the valve switch 112 opens, the input of the first exclusive OR-gate 120, connected to the resistor 126, once again goes high as does the output of the first exclusive OR-gate 120. However, because both inputs of the second exclusive OR-gate 122 are high at this time, the low to high transition at the output of the first exclusive OR-gate 120 has no effect on the solenoid 66.

In view of the foregoing, it will be appreciated that the circuit 119 illustrated in FIG. 4 functions to momentarily energize the solenoid 66 so that the valve switch 112 remains open when the ignition switch 36 is closed, and so that the valve switch 112 remains closed when the ignition switch 36 is open. Therefore, the valve 52 is open when the ignition switch 36 is closed and is closed when the ignition switch 36 is open.

If for some reason the solenoid 66 becomes inoperable or there is a loss of power to the solenoid 66, the valve apparatus 40 can be manually operated. As shown in FIGS. 1–3, the valve apparatus 40 includes a button 200 supported by the lower end of the housing 42. As shown in FIG. 1, the bracket 39 supports the housing 42 above the tank 38 so that the button 200 is accessible. When the button 200 is pushed in or upwardly, it engages the solenoid plunger 70, moves the plunger 70 upwardly and thereby moves the plunger 82 upwardly. Therefore, moving the button 200 upwardly has the same effect as energizing the solenoid 66, and releasing the button 200 has the same effect as deenergizing the solenoid 66. Accordingly, the state of the fuel supply valve 52 can be manually changed simply by pushing in the button 200 and then releasing it.

Various features of the invention are set forth in the following claims.

We claim:

1. A marine installation comprising a propulsion unit adapted to be mounted on a boat for pivotal movement relative thereto about a generally vertical steering axis, said propulsion unit including a rotatably mounted propeller shaft, an engine drivingly connected to said propeller shaft, a fuel supply valve adapted to communicate between a fuel reservoir and said engine and actuatable between a first state and a second state for respectively permitting and preventing fuel flow from the fuel reservoir, a control switch operably connected to said engine and actuatable between a first sate and a second state for respectively permitting and preventing engine operation, and means responsive to the state of both said fuel supply valve and said control switch for maintaining both of said fuel supply valve and said control switch in the same one of said first and second states.

2. A marine installation as set forth in claim 1 wherein said maintaining means includes a solenoid actuatable between and energized condition and a deenergized condition, means for changing the state of one of said fuel supply valve and said control switch in response to momentary energization of said solenoid, and means for momentarily energizing said solenoid when said fuel supply valve and said control switch are in different states.

3. A marine installation as set forth in claim 2 wherein said energizing means includes means responsive to input from both said fuel supply valve and said control switch for producing an output when said fuel supply valve and said control switch are in different states, and means for momentarily energizing said solenoid in response to said output.

4. A marine installation as set forth in claim 2 wherein said means for momentarily energizing said solenoid includes a valve switch actuatable between a first state and a second state, means for maintaining said valve switch in the same state as said fuel supply valve, and means for momentarily energizing said solenoid when said valve switch and said control switch are in different states.

5. A marine installation as set forth in claim 1 wherein said engine includes an ignition system, and wherein said control switch is operably connected to said ignition system, is closed in said first state, and is open in said second state.

6. A marine installation as set forth in claim 1 wherein said fuel supply valve is open in said first state and is closed in said second state.

7. A marine installation as set forth in claim 1 wherein said maintaining means includes a solenoid actuatable between an energized condition and a deenergized condition, means for changing the state of one of said fuel supply valve and said control switch in response to energization and deenergization of said solenoid, and means for energizing and deenergizing said solenoid when said fuel supply valve and said control switch are in different states.

8. A marine installation as set forth in claim 7 wherein said energizing means includes means responsive to input from both said fuel supply valve and said control switch for producing an output when said fuel supply valve and said control switch are in different states, and means for momentarily energizing said solenoid in response to said output.

9. A marine installation as set forth in claim 7 wherein said means for energizing and deenergizing said solenoid includes a valve switch actuatable between a first state and a second state, means for maintaining said valve switch in the same state as said fuel supply valve, and means for energizing and deenergizing said solenoid when said valve switch and said control switch are in different states.

10. A marine installation comprising a propulsion unit adapted to be mounted on a boat for pivotal movement relative thereto about a generally vertical steering axis, said propulsion unit including a rotatably mounted propeller shaft adapted to support a propeller, an engine drivingly connected to said propeller shaft, a fuel supply valve adapted to communicate between a fuel reservoir and said engine and locatable between a first state and a second state for respectively permitting and preventing fuel flow from the fuel reservoir and including a solenoid actuatable between an energized condition and a deenergized condition, means including a valve switch moveable to and from an actuating position for energizing said solenoid for a predetermined time period other than the time interval during which said valve switch is in said actuating position, and means for changing the state of said fuel supply valve when said solenoid is energized.

11. A marine installation comprising a propulsion unit adapted to be mounted on a boat for pivotal movement relative thereto about a generally vertical steering axis, said propulsion unit including a rotatably mounted propeller shaft adapted to support a propeller, an engine drivingly connected to said propeller shaft, a fuel supply valve adapted to communicate between a fuel reservoir and said engine and locatable between an first state and a second state for respectively permitting and preventing fuel flow from the fuel reservoir and including a solenoid actuatable between and energized condition and a deenergized condition, a valve switch actuatable between a first state and a second state, means responsive to location of said fuel supply valve in one of said first and second states for maintaining said valve switch in the same one of said first and second states, and an ignition switch operably connected to said engine and actuatable between a first state and a second state for respectively permitting and preventing engine operation, means for energizing said solenoid for only a limited time period, said means for energizing said solenoid operating when said valve switch and said ignition switch are respectively in different ones of said first and second states, and means for changing the state of said fuel supply valve when said solenoid is energized.

12. A valve apparatus for use with a marine installation including a propulsion unit adapted to be mounted on a boat for pivotal movement relative thereto about a generally vertical steering axis, the propulsion unit including a rotatably mounted propeller shaft adapted to support a propeller, and engine drivingly connected to the propeller shaft, a fuel reservoir, and a control switch operably connected to the engine and actuatable between a first state and a second state for respectively permitting and preventing engine operation, said apparatus comprising a fuel supply valve adapted to communicate between the fuel reservoir and the engine and actuatable between a first state and a second state for respectively permitting and preventing fuel flow from the fuel reservoir, and means responsive to the state of both said fuel supply valve and the control switch for maintaining both of said fuel supply valve and the control switch in the same one of said first and second states.

13. An apparatus as set forth in claim 12 wherein said maintaining means includes a solenoid actuatable between an energized condition and a deenergized condition, means for changing the state of said fuel supply valve when said solenoid is momentarily energized, and means for momentarily energizing said solenoid when said fuel supply valve and the control switch are in different states.

14. An apparatus as set forth in claim 13 wherein said energizing means includes means responsive to input from both said fuel supply valve and the control switch for providing an output when said fuel supply valve and the control switch are in different states, and means for momentarily energizing said solenoid in response to said output.

15. An apparatus as set forth in claim 13 wherein said means for momentarily energizing said solenoid includes a valve switch actuatable between a first state and a second state, means for maintaining said valve switch in the same state as said fuel supply valve, and means for momentarily energizing said solenoid when said valve switch and the control switch are in different states.

16. An apparatus as set forth in claim 12 wherein the engine includes an ignition system, and wherein the control switch is operably connected to the ignition system, is closed in the first state, and is open in the second state.

17. An apparatus as set forth in claim 12 wherein said fuel supply valve is open in said first state and is closed in said second state.

18. An apparatus as set forth in claim 12 wherein said maintaining means includes a solenoid actuatable between an energized condition and a deenergized condition, means for changing the state of said fuel supply valve in response to energization and deenergization of said solenoid, and means for energizing and deenergizing said solenoid when said fuel supply valve and the control switch are in different states.

19. An apparatus as set forth in claim 18 wherein said energizing means includes means responsive to input from both said fuel supply valve and said control switch for producing an output when said fuel supply valve and said control switch are in different states, and means for momentarily emergizing said solenoid in response to said output.

20. An apparatus as set forth in claim 18 wherein said means for energizing and deenergizing said solenoid includes a valve switch actuatable between a first state and a second state, means for maintaining said valve switch in the same state as said fuel supply valve, and means for energizing and deenergizing said solenoid when said valve switch and the control switch are in different states.

21. A valve apparatus comprising a valve including an inlet and an outlet, set valve being locatable between a first state and a second state for respectively permitting and preventing fluid from said inlet to said outlet, solenoid means for changing the state of said valve, a valve switch actuatable between an open state and a closed state, and means responsive to the location of said valve in one of said first and second states for opening said valve switch and responsive to the location of said valve in the other of said first and second states for closing said valve switch.

* * * * *